United States Patent
Cho et al.

(10) Patent No.: US 12,363,416 B2
(45) Date of Patent: Jul. 15, 2025

(54) CAMERA MODULE

(71) Applicant: LG INNOTEK CO., LTD., Seoul (KR)

(72) Inventors: Jae Hong Cho, Seoul (KR); Hee Se Lee, Seoul (KR); Jin Suk Han, Seoul (KR); In Jae Yeo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 500 days.

(21) Appl. No.: 17/805,162

(22) Filed: Jun. 2, 2022

(65) Prior Publication Data
US 2022/0294951 A1  Sep. 15, 2022

Related U.S. Application Data

(63) Continuation of application No. 16/444,586, filed on Jun. 18, 2019, now Pat. No. 11,381,724, which is a
(Continued)

(30) Foreign Application Priority Data

Dec. 24, 2014 (KR) .................. 10-2014-0188422
Jan. 6, 2015 (KR) .................. 10-2015-0001169

(51) Int. Cl.
*H04N 23/57* (2023.01)
(52) U.S. Cl.
CPC .................. *H04N 23/57* (2023.01)
(58) Field of Classification Search
CPC .. H04N 5/2257; H04N 5/2252; H04N 5/2253; H04N 5/2254
(Continued)

(56) References Cited

U.S. PATENT DOCUMENTS

2010/0091120 A1  4/2010  Nagata et al.
2012/0307088 A1  12/2012  Han
(Continued)

FOREIGN PATENT DOCUMENTS

CN      2800554 Y    7/2006
CN    201166726 Y   12/2008
(Continued)

OTHER PUBLICATIONS

Office Action dated Jan. 25, 2021 in Korean Application No. 10-2014-0188422.
(Continued)

*Primary Examiner* — Stephen P Coleman
(74) *Attorney, Agent, or Firm* — Saliwanchik, Lloyd & Eisenschenk

(57) ABSTRACT

The exemplary embodiment of the present disclosure relates to a camera module including a bobbin, a housing positioned at an outside of the bobbin, an elastic member coupled to the bobbin and the housing, a foreign object exhaust passage concavely formed at an upper surface of the housing, and an opening formed at the housing to open at least a part of the foreign object exhaust passage to an inside of the housing, wherein the foreign object exhaust passage is overlapped on at least a part of the housing-coupled elastic member to a vertical direction, whereby it is easy to wash foreign objects positioned between an elastic member and a housing to reduce an auto focus tilt defects generated after assembly.

20 Claims, 10 Drawing Sheets

Related U.S. Application Data continuation of application No. 15/888,684, filed on Feb. 5, 2018, now Pat. No. 10,367,982, which is a continuation of application No. 15/694,412, filed on Sep. 1, 2017, now Pat. No. 9,917,997, which is a continuation of application No. 14/980,964, filed on Dec. 28, 2015, now Pat. No. 9,781,322.

(58) Field of Classification Search
USPC .......................................................... 348/357
See application file for complete search history.

(56) References Cited

U.S. PATENT DOCUMENTS

| | | | | |
|---|---|---|---|---|
| 2014/0355120 | A1* | 12/2014 | Yeo | G02B 7/09 |
| | | | | 359/557 |
| 2015/0116576 | A1 | 4/2015 | Grandin et al. | |

FOREIGN PATENT DOCUMENTS

| | | |
|---|---|---|
| CN | 102811307 A | 12/2012 |
| CN | 103238109 A | 8/2013 |
| CN | 103901701 A | 7/2014 |
| CN | 103999444 A | 8/2014 |
| CN | 104216199 A | 12/2014 |
| JP | H07-239437 A | 9/1995 |
| JP | 2004-354446 A | 12/2004 |
| JP | 2005-347409 A | 12/2005 |
| JP | 2009-288641 A | 12/2009 |
| JP | 2011-155414 A | 8/2011 |
| KR | 10-2011-0058108 A | 6/2011 |
| KR | 10-2012-0065492 A | 6/2012 |
| KR | 10-2012-0106017 A | 9/2012 |
| KR | 10-2013-0003819 A | 1/2013 |
| KR | 10-2013-0012437 A | 2/2013 |
| KR | 10-2013-0057089 A | 5/2013 |
| KR | 10-2014-0030769 A | 3/2014 |
| KR | 10-2014-0060066 A | 5/2014 |
| KR | 10-2014-0140329 A | 12/2014 |
| WO | 2014/035038 A1 | 3/2014 |

OTHER PUBLICATIONS

Office Action dated Jan. 26, 2022 in Korean Application No. 10-2021-0131227.
Office Action dated Oct. 17, 2016 in U.S. Appl. No. 14/980,964.
Notice of Allowance dated Jun. 1, 2017 in U.S. Appl. No. 14/980,964.
Notice of Allowance dated Oct. 30, 2017 in U.S. Appl. No. 15/694,412.
Office Action dated May 25, 2018 in U.S. Appl. No. 15/888,684.
Notice of Allowance dated Mar. 18, 2019 in U.S. Appl. No. 15/888,684.
Office Action dated May 27, 2021 in Chinese Application No. 202010485606.4.
Office Action dated Jun. 3, 2021 in Chinese Application No. 202010485609.8.
Office Action dated May 14, 2021 in Korean Application No. 10-2015-0001169.
Office Action dated Jun. 9, 2021 in Chinese Application No. 202010485579.0.
Office Action dated Jul. 15, 2019 in Chinese Application No. 201510990183.0.
Office Action dated Jul. 6, 2022 in Korean Application No. 10-2022-0047789.

* cited by examiner

CAMERA MODULE

CROSS-REFERENCE TO RELATED APPLICATIONS

This application is a continuation of U.S. application Ser. No. 16/444,586, filed Jun. 18, 2019; which is a continuation of U.S. application Ser. No. 15/888,684, filed Feb. 5, 2018, now U.S. Pat. No. 10,367,982, issued Jul. 30, 2019; which is a continuation of U.S. application Ser. No. 15/694,412, filed Sep. 1, 2017, now U.S. Pat. No. 9,917,997, issued Mar. 13, 2018; which is a continuation of U.S. application Ser. No. 14/980,964, filed Dec. 28, 2015, now U.S. Pat. No. 9,781,322, issued Oct. 3, 2017; which claims the benefit under 35 U.S.C. § 119 of Korean Application Nos. 10-2014-0188422, filed Dec. 24, 2014; and 10-2015-0001169, filed Jan. 6, 2015; which are hereby incorporated by reference in their entirety.

BACKGROUND

Field of the Invention

The teachings in accordance with exemplary and non-limiting embodiments of this disclosure generally relate generally to a camera module.

Background of the Related Art

This section provides background information related to the present disclosure which is not necessarily prior art.

A general camera module equipped with an AF (Auto-Focusing) function includes therein a magnet and a coil for providing auto focusing function. When a power is supplied to a coil, a bobbin formed with the coil moves to an optical axis direction relative to a housing equipped with a magnet in response to interaction with a magnetic force of the magnet to thereby provide an auto focusing function. Thus, there is a need for a bobbin to be movably fixed to housing. To this end, the bobbin and the housing may be coupled by an elastic member.

Meantime, when the bobbin and the housing are coupled by the elastic member, and when assembly is completed while foreign objects such as threads, dusts and metal pieces are inserted between the housing and the elastic member, the foreign objects may thereafter touch the elastic member to cause a reason of increased process defect rates because of being classified as auto focusing tilt defects.

In addition, even if washing process of foreign objects is performed before assembly completion, chances are detergents mixed with foreign objects fail to escape due to being entrapped between the elastic member and the housing, whereby serious problems such as auto focusing tilt defects and auto focus hysteresis defects may be generated by stickiness of detergents mixed with the foreign objects.

Meantime, a bobbin is generally manufactured through injection molding, and burrs remain in the bobbin due to characteristics of injection molding. At this time, the burrs may remain inside a camera module due to detachment of burrs when a part of the bobbin contacts a part of the housing during vertical movement of bobbin inside the housing.

It is problematic that the foreign objects such as the burrs result in decreases in quality and performances of camera module.

BRIEF SUMMARY

This section provides a general summary of the disclosure, and is not a comprehensive disclosure of its full scope or all of its features.

Exemplary aspects of the present disclosure are to substantially solve at least the above problems and/or disadvantages and to provide at least the advantages of a camera module, and therefore, it is an object of the present disclosure to provide a camera module including a foreign object exhaust passage so formed as to naturally discharge an exhaust fluid (foreign objects and detergents) positioned between an elastic member and a housing.

It is another object to provide a camera module configured to inhibit burrs generated during injection molding of a bobbin from being introduced inside the camera module.

It should be emphasized, however, that the present disclosure is not limited to a particular disclosure, as explained above. It should be understood that other technical objects not mentioned herein may be appreciated by those skilled in the art.

Accordingly, in one general aspect of the present disclosure, there is provided a camera module, the camera module comprising:
a bobbin;
a housing positioned at an outside of the bobbin;
an elastic member coupled to the bobbin and the housing;
a foreign object exhaust passage concavely formed at an upper surface of the housing; and
an opening formed at the housing to open at least a part of the foreign object exhaust passage to an inside of the housing; wherein
the foreign object exhaust passage is overlapped on at least a part of the housing-coupled elastic member to a vertical direction.

Also, the camera module comprising: a bobbin; a housing disposed at an outside of the bobbin; an elastic member coupled to the bobbin and the housing; a foreign object exhaust passage concavely formed at an upper surface of the housing; and an opening formed at the housing, and exposing at least a part of the foreign object exhaust passage to an inside of the housing; wherein at least a part of the foreign object exhaust passage is overlapped with the elastic member coupled to the housing to an upward-downward direction.

Preferably, but not necessarily, the foreign object exhaust passage may include a first passage and a second passage configured to be selectively supported by a support lug of the bobbin, wherein the second passage is arranged between the first passage and the opening and more concaved than the first passage.

Preferably, but not necessarily, at least a part of the first passage and at least a part of the second passage may be slanted to an opening direction.

Preferably, but not necessarily, the foreign object exhaust passage may further include a connection passage configured to connect the first passage and the second passage, wherein the connection passage connects a distal end at one side of the first passage and a distal end at one side of the second passage.

Preferably, but not necessarily, at least a part of the first passage may be slanted to a connection passage direction, and at least a part of the second passage may be slanted to an opening direction.

Preferably, but not necessarily, the connection passage may include a slanted surface slanted from the first passage to the second passage.

Preferably, but not necessarily, the camera module may further comprise a lug positioned between the first and second passages and protruded higher than the first passage to support the elastic member coupled to an elastic member coupling lug.

Preferably, but not necessarily, the elastic member may include an upper elastic member configured to connect an upper end of the bobbin and an upper end of the housing, and a bottom elastic member configured to connect a lower end of the bobbin and a lower end of the housing, wherein the foreign object exhaust passage is positioned at a lower end of the upper elastic member.

Preferably, but not necessarily, the camera module may further comprise a first driving part arranged at the bobbin and a second driving part formed opposite to the first driving part.

In another general aspect of the present disclosure, there is provided a camera module, the camera module comprising:
- a bobbin;
- a first driving part positioned at an outside of the bobbin;
- a housing positioned at an outside of the bobbin;
- a second driving part arranged at the housing to interact with the first driving part;
- a stopper protrusively formed from a periphery of the bobbin to the housing; and
- a rib arranged at the housing to selectively support a lower end of the stopper, wherein
- the stopper includes a contact part protrusively formed at a bottom surface to face downwards, and the contact part has a shape dissimilar to that of the stopper.

Also, the camera module comprising: a bobbin; a first driving part disposed at the bobbin; a housing disposed at an outside of the bobbin; a second driving part disposed at the housing, and interacting with the first driving part; a stopper protrusively formed from a periphery of the bobbin to the housing; and a rib disposed at the housing, and selectively supporting the stopper at a bottom side, wherein the stopper includes a contact part downwardly protrusively formed from a bottom surface, and wherein the contact part has a shape dissimilar to that of the stopper in a bottom view.

Preferably, but not necessarily, width of the contact part may be smaller at least at a part than that of the stopper.

Preferably, but not necessarily, a distance from the periphery of the bobbin to a distal end of the contact part may be shorter than a distance from the periphery of the bobbin to a distal end of the stopper.

Preferably, but not necessarily, the contact part may be formed by a part of the bottom surface of the stopper protruding downwards.

Preferably, but not necessarily, the contact part may be formed by a part of the bottom surface of the stopper being concavely sunk upwards.

Preferably, but not necessarily, thickness of the contact part may be thicker than that of the burr formed at the stopper.

Preferably, but not necessarily, the contact part may gradually taper off in width thereof toward an outside.

Preferably, but not necessarily, the contact part may be formed in a shape of a cube whose upper and lower surfaces are of a trapezoidal shape.

Preferably, but not necessarily, the rib may include a stopper reception groove formed by a part of an upper surface being concavely sunk downwards in a shape corresponding to that of at least a part of the stopper.

Preferably, but not necessarily, the camera module may further comprise a cushion material arranged at a lower end of the contact part or at an upper end of the stopper reception groove to vertically overlap the contact part and the stopper reception groove.

Preferably, but not necessarily, the first driving part may include a coil, the second driving part may include a magnet, wherein the rib may be arranged at a lower end with a magnet reception part to receive the magnet.

Advantageous Effects of the Disclosure

Teachings in accordance with the exemplary embodiments of the present disclosure have an advantageous effect in that it is easy to wash foreign objects positioned between an elastic member and a housing to thereby reduce an auto focus tilt defects generated after assembly.

Another advantageous effect is that stability in camera operation can be reinforced by inhibiting foreign objects from being introduced into a camera module due to burrs generable during injection molding of bobbin or housing inhibited from being detached by forming a contact area between a stopper and a rib by forming a lug or a groove part on the stopper or the rib formed on the bobbin.

Still another advantageous effect is that operation defect rate of camera caused by stickiness between a stopper and a rib can be reduced, even if foreign objects such as faction and adhesive remain on a housing by reducing a contact area between a stopper and a rib by forming a lug or a groove part on the stopper or the rib.

DETAILED DESCRIPTION

Figure 1:
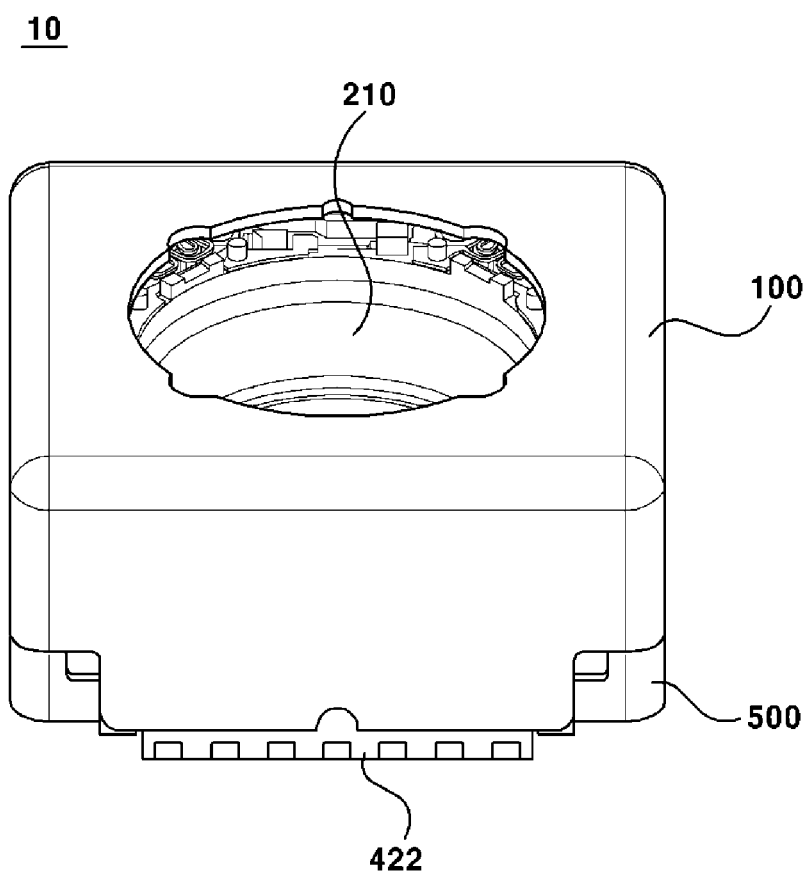
FIG. 1 is a perspective view illustrating a lens driving part according to a first exemplary embodiment of the present disclosure.

Exemplary embodiments of the present disclosure will be described in detail with reference to the accompanying drawings. It will be understood that same reference numerals are used throughout the different drawings to designate the same components. In describing the present disclosure, detailed descriptions of constructions or processes known in the art may be omitted to avoid obscuring appreciation of the invention by a person of ordinary skill in the art with unnecessary detail regarding such known constructions and functions.

It will be understood that, although the terms first, second, third, A, B, (a), (b), etc., may be used herein to describe various elements, components, regions, layers and/or sections, these elements, components, regions, layers and/or sections should not be limited by these terms. These terms are only used to distinguish one element, component, region, layer or section from another element, component, region, layer or section.

When an element or layer is referred to as being "on," "engaged to," "connected to," or "coupled to" another element or layer, it may be directly on, engaged, connected or coupled to the other element or layer, or intervening elements or layers may be present.

The optical direction to be used hereinafter may be defined as an optical direction of a lens module coupled to a lens driving part. Meantime, the optical direction may be interchangeably used with a vertical direction and z axis direction.

The "auto focus function" to be used hereinafter may be defined as a function of adjusting a focus relative to a subject by adjusting a distance to an image sensor by moving a lens module to an optical direction in response to a distance to the subject such that a clear image of the subject can be obtained on the image sensor. Meantime, the meaning of "auto focus" may be interchangeably used with AF (Auto Focus).

The "handshake correction function" to be used hereinafter may be defined as a function of moving or tilting a lens module to a direction perpendicular to an optical direction to offset vibration (movement) generated by an image sensor from an outside force. Meantime, the "handshake correction" may be interchangeably used with "OIS (Optical Image Stabilization)".

The exhaust fluid (foreign objects and detergents) to be used hereinafter may be commonly defined as "foreign objects" such as threads, dust and metal debris positioned at a housing (320) and elastic members (610, 620) and "detergents" supplied to wash the foreign objects.

Now, a configuration of an optical device according to exemplary embodiments of the present disclosure will be described in detail.

The optical devices according to the present disclosure may include hand phones, portable phones, smart phones, portable smart devices, digital cameras, laptop computers, digital broadcasting terminals, PDAs (Personal Digital Assistants), PMPs (Portable Multimedia Players), and navigations, but may not be limited thereto and may include any devices for photographing images or photographs.

The optical device according to exemplary embodiments of the present disclosure may include a body (not shown), a display part (not shown) arranged at one surface of the body to display information and a camera (not shown) mounted at the body to photograph an image or a photograph and formed with a camera module (not shown).

Hereinafter, configuration of camera module according to exemplary embodiments of the present disclosure will be described in detail.

The camera module may further include a lens driving device (not shown), a lens module (not shown), an IR (Infrared) cut-off filter (not shown), a PCB (Printed Circuit Board, not shown), an image sensor (not shown) and a controller (not shown).

A lens module may include one or more lenses (not shown), and a lens barrel configured to accommodate one or more lenses. However, one configuration of lens module is not limited to a lens barrel, and any holder construction configured to hold one or more lenses may be possible. The lens module may move along with a lens driving device by being coupled to the lens driving device. The lens module may be coupled to an inside of a lens driving device, for example. The lens module may be screw-connected to a lens driving device, for example. The lens module may be coupled to a lens driving module using an adhesive (not shown), for example. Meantime, a light having passed a lens module may be irradiated to an image sensor.

The IR cut-off filter can cut off a light of IR area incident on an image sensor, The IR cut-off filter may be positioned between a lens module and an image sensor, for example. The IR cut-off filter may be positioned at a holder member (not shown) formed separately from a base (500). However, the IR cut-off filter may be mounted at a through hole (510) centrally formed at the base (500). The IR cut-off filter may be formed with a film material or glass material, for example. Meantime, the IR cut-off filter may be formed by coating a plate optical filter such as an image area protecting cover glass or a cover glass with an IR cut-off coating material.

The PCB may support a lens driving device. The PCB may be mounted with an image sensor. By way of example, the PCB may be mounted at an upper inner side with an image sensor, and at an upper outside with a sensor holder (not shown). The sensor holder may be positioned at an upper side with a lens driving part. Furthermore, the PCB may be positioned at an upper outside with a lens driving part and at an upper inside with an image sensor. A light having passed a lens module accommodated inside of the lens driving part may be irradiated to the image sensor mounted at the PCB using this configuration thus explained. The PCB may be positioned with a controller configured to control the lens driving part.

The image sensor may be mounted on the PCB. The image sensor may be so positioned as to allow an optical axis to be aligned with the lens module, whereby the image sensor may obtain a light having passed the lens module. The image sensor may be a CCD (Charge Coupled Device), an MOS (Metal Oxide Semi-conductor), a CPD and a CID, for example. However, the kinds of image sensor are not limited thereto.

The controller may be mounted on a PCB. The controller may be positioned at an outside of the lens driving part. However, the controller may be positioned at an inside of the lens driving part. The controller may control a direction, intensity and amplitude of current supplied to each component of the lens driving part. The controller may perform at least any one of auto focus function and handshake correction function of a camera module by controlling the lens driving part.

That is, the controller may move a lens module to an optical axis direction, to a direction perpendicular to the optical axis direction, or tilt the lens module by controlling the lens driving part. Furthermore, the controller may perform a feedback control of the auto focus function and handshake correction function. To be more specific, the controller may control a power or a current applied to first, second and third driving parts (220, 320, 420) by receiving a position of a bobbin (210) or a housing (310) detected by a sensor part (700).

Hereinafter, the configuration of lens driving part according to a first exemplary embodiment of the present disclosure will be described with reference to the accompanying drawings.

Figure 2:
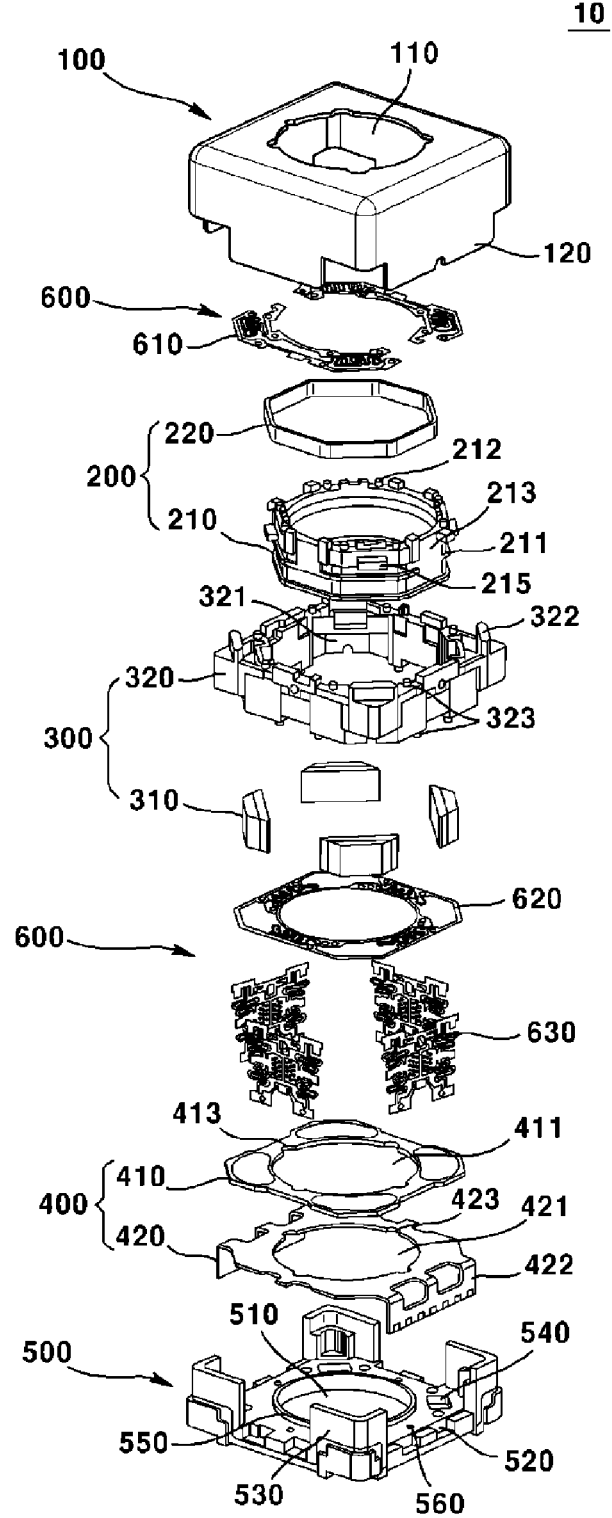
FIG. 2 is an exploded perspective view of lens driving part according to a first exemplary embodiment of the present disclosure.

FIG. 1 is a perspective view illustrating a lens driving part according to a first exemplary embodiment of the present disclosure, and FIG. 2 is an exploded perspective view of lens driving part according to a first exemplary embodiment of the present disclosure.

Referring to FIGS. 1 and 2, a lens driving part according to a first exemplary embodiment of the present disclosure may include a cover can (100), a first mover (200), a second mover (300), a stator (400), a base (500) and an elastic unit (600).

The cover can (100) may form an exterior look of a camera module by accommodating the elastic unit (600), the first mover (200), the stator (400) and the second mover (300) and mounting these components to the base (500). To be more specific, the cover can (100) may be mounted to the base (500, described later) by allowing an inner side thereof being closely contacted to a partial lateral surface or an entire lateral surface of the base (500) to protect internal components against external shocks and to simultaneously inhibit external contaminants from penetrating.

Furthermore, the cover can (100) may also perform a function of protecting components of camera module against external electronic interference generated by mobile phones. Thus, the cover can (100) may be formed with a metal material.

The cover can (100) may be realized by a yoke unit itself, or a yoke unit is molded and fixed inside the cover can. The cover can (100) in the exemplary embodiment of the present disclosure may be formed at an upper side with an opening (110) for exposing a lens unit (not shown), and at an upper bottom surface with an inner yoke (not shown) formed by being inwardly bent into the cover can (100). The inner yoke may be position at a concave unit (213) formed at the bobbin (210, described later). In this case, the inner Yoke may be arranged at a peripheral corner of the opening at an upper surface of the yoke unit, or may be arranged at a lateral surface. The concave unit (213) of the bobbin (210) may be formed at a corresponding position.

Furthermore, the cover can (100) may be formed at each bottom end with at least one extensively formed coupling piece (120), and the base (500) may be formed with a coupling groove (520) inserted by the coupling piece (120), whereby the camera module can perform a sturdier and closer tightening function and coupling function.

The first mover (200) may be arranged at a lateral surface of a lens unit in order to move the lens unit. The first mover (200) may include a bobbin (210) configured to fix the lens unit and a first coil unit (220) arranged at a periphery of the bobbin (210). The lens unit may be a lens barrel formed with at least one lens (not shown). However, the present disclosure is not limited thereto, and any holder structure capable of supporting a lens may be included as a lens unit.

The bobbin (210) may be coupled at an inner surface to a periphery of the lens unit to fix the lens unit. Furthermore, the bobbin (210) may be formed at a periphery with a guide unit (211) configured to guide the first coil unit (220, described later) to be wound or mounted. The guide unit (211) may be continuously formed along the periphery of the bobbin (210) or formed by being spaced apart at a predetermined distance.

Furthermore, the bobbin (210) may be formed at an upper surface and a bottom surface with an upper elastic member (610) configured to support the bobbin (210) relative to an upper side and a bottom side or an elastic member coupling lug (212) coupled by a bottom elastic member (620). The bobbin (210) may further include a concave unit (213) formed at a periphery in order to allow the inner yoke of the cover can (100) to be interposed between the bobbin (210) and the first coil unit (220) wound on the bobbin (210).

Furthermore, the bobbin (210) may be mounted with a support lug (215) formed at a periphery. The support lug (215) may be selectively supported at a bottom side by a second exhaust passage (332) of the housing (320). That is, the support lug (215) of the bobbin (210) may be supported by the second exhaust passage (332) of the housing (320) in response to relative movement to the housing (320) of the bobbin (210). To be more specific, the second exhaust passage (332) of the housing (320) may restrict the movement of the bobbin (210) relative to the housing (320) through interaction with the support lug (215) of the bobbin (210).

The first coil unit (220) may be guided by the guide unit (211) to be wound on the periphery of the bobbin (210), but four (4) individual coils may be arranged at the periphery of the bobbin (210) each at 90° interval. The first coil unit (220) may form an electromagnetic field by receiving a power applied to the PCB (not shown).

The second mover (300) may be positioned at a lateral surface of the first mover (200) in opposition to the first mover (200), and may include a magnet (310) arranged opposite to the first coil (220) and a housing (320) fixed by the magnet (310).

To be more specific, the magnet (310) may be positioned at a position corresponding to that of a periphery of the first coil unit (220), mounted by to the housing (320) by an adhesive, and mounted on four corners inside the housing (320) each at an equidistance to thereby promote an effective use of inner volume.

The housing (320) may be formed in a shape corresponding to that of an inner lateral surface of the cover can (100) forming the exterior look of the camera module. Furthermore, the housing (320) may be formed with an insulating material, may be formed in an extrusion in consideration of productivity, and may be arranged at a predetermined distance from the cover can (100) as a moving part for driving an OIS (Optical Image Stabilization) operation.

The housing (320) in an exemplary embodiment according to the present disclosure may be formed in a shape corresponding to that of the cover can (100) by being spaced apart at a predetermined distance and may be opened at upper and bottom surfaces to movably accommodate the first mover (200) in a vertical direction.

Furthermore, the housing (320) may include, at a lateral surface. a magnet accommodation unit (321) configured to accommodate the magnet (310) in a shape corresponding to that of the magnet (310). The housing may include, at an upper surface, at least two stoppers (322) configured to absorb a shock by being in contact with an upper side of the cover can (100) during occurrence of external shocks, each stopper being protrusively formed at a predetermined distance. The stopper (322) may be integrally formed with the housing (320).

Furthermore, the housing (320) may be formed at upper and bottom surfaces with an elastic coupling lug (323) coupled by the upper elastic member (610) or the bottom elastic member (620) as in the bobbin (210).

The stator (400) may be arranged at a bottom surface of the second mover (300) in opposition to a position of the second mover (300) in order to move the second mover (300). Furthermore, the stator (400) may be centrally formed with through holes (411, 421) corresponding to the lens unit.

To be more specific, the stator (400) may include a second coil unit (410) positioned opposite to a bottom surface of the magnet (310), and a substrate configured to supply a power by being arranged at an upper surface of the second coil unit (410), where the substrate may include an FPCB (420, Flexible Printed Circuit Board).

The second coil unit (410) may be mounted or formed on the FPCB (420) formed at an upper side of the base (500, described later), and may be centrally formed with a through hole (411) to pass an optical signal of the lens unit.

Meantime, in consideration of miniaturization of camera module (decreased height to z axis which is an optical axis direction), the second coil unit (410) may be formed in an FP coil which is a patterned coil to thereby be arranged on the FPCB. The FPCB (420) may be mounted at an upper surface of the base (500) in order to apply a power to the second coil unit (410), and may be formed with a through hole (421) corresponding to the through hole (411) of the second coil unit (410). Furthermore, the FPCB (420) may include a terminal unit (422) protruding downwards of the base (500) by being bent at one end or both ends, and may receive an external power through the terminal unit (422).

The camera module according to an exemplary embodiment of the present disclosure may further comprise a hall sensor unit (not shown) mounted at a bottom surface or an upper surface of the FPCB (420) in order to correspond in position to the magnet (310).

The hall sensor unit is configured to detect the movement of magnet (310) and to accurately control the actuator through interaction with the FPCB (420). The hall sensor unit may be arranged on a straight line parallel with the magnet (310) and the optical axis. Furthermore, the hall sensor unit may include two hall sensors mounted at adjacent corners among corners of the FPCB (420), because the hall sensor unit must detect the displacements of x axis and y axis. Furthermore, the base (500) may be formed with a hall sensor accommodation groove (540) configured to accommodate the hall sensors.

The hall sensor unit may be formed more adjacent to the second coil unit (410) than to the magnet (310), but the influence of the second coil unit (410) is not a subject of consideration in detection of movement of magnet (310) in view of the fact that an intensity of magnet field formed by the magnet (310) is greater by hundreds times than that of the electromagnetic field formed by the coil.

The lens unit may move to a front direction by independent or organic interaction among the first mover (200), the second mover and the stator (400) to focus an image focus of a subject through interaction between the first mover (200) and/or the second mover (300), and to correct the handshake through interaction between the first mover (200) and/or the second mover (300).

Meantime, the base (500) may support the stator (400) and the second mover (300) and may be centrally formed with a hollow hole (510) corresponding to the through holes (411, 421). The base (500) may perform a sensor holder function to protect an image sensor (not shown) and may be formed in order to position the IR filter (not shown). In this case, the IR (Infrared Ray) filter may be mounted at the hollow hole (510) centrally formed at the base (500). The IR filter may be formed by a film material or glass material, for example, and may be arranged with a plate optical filter coated with an IR cut-off coating material on an image surface protection cover glass, or a cover glass. Furthermore, the base (500) may be positioned thereunder with a separate sensor holder (not shown).

The base (500) may be formed with at least one fixation lug (530) protruded from an upper corner to contact or to be coupled to an inner lateral surface of the cover can (100), where the fixation lug (530) serves to guide the cover can (100) to be easily coupled and to simultaneously facilitate a sturdy fixation after coupling.

Furthermore, the base (500) may be formed with a coupling groove (520) inserted by the coupling piece (120) of the cover can (100). The coupling groove (520) may be locally formed at a periphery of the base (500) to correspond in shape to a length of the coupling piece (120) or may be formed over an entire periphery of the base (500) to allow a predetermined portion at a bottom end of the cover can (100) including the coupling piece (120) to be inserted into the coupling groove (520).

At this time, foreign objects may be introduced through the stator (400), the through holes (411, 421) of the base (500) and the hollow hole (510), and the foreign objects may contaminate various devices and image sensor mounted on the PCB disposed thereunder to thereby degrade the performance of camera module. Particularly, when the camera module is equipped with the OIS (Optical Image Stabilization) function, an FP coil and/or an FPCB (420) may be used, where the through holes (411, 421) are centrally formed and other shapes based on the camera module are processed, and these processes generate lots of foreign objects, and even if cleaning is performed after processing, the foreign objects may still remain to create lot of problems.

Hence, a reception lug unit (550) protruded from an upper surface of the base (500) formed with the hollow hole (510) may be included in the first exemplary embodiment of the present disclosure. To be more specific, the reception lug unit (550) is so formed as to wrap an inner surface of the through holes (411, 421) of the stator (400) by being inserted into the through holes (411, 421) of the stator (400). The reception lug unit (550) may be equal to or smaller than an inner surface of the through holes (411, 421) of the stator in terms of diameter.

Furthermore, the reception lug unit (550) may be integrally formed with the base (500) and may be formed by being protruded in a round ring shape, as shown in the drawing, or at least two lugs may be protrusively formed each at equidistance or at a predetermined distance to form the reception lug unit (550).

Furthermore, the exemplary embodiment of the present disclosure may further include the following characteristics in order to inhibit the foreign objects from generating from the stator (400) and to firmly mount the stator (400).

The base (500) may be formed at an upper surface with at least two contact grooves (560) to an external direction of the reception lug unit (550) and the stator (400) may be formed with concave grooves (413, 423) formed at a position corresponding to that of the contact grooves (413, 423).

That is, the concave grooves (413, 423) may be correspondingly formed to the second coil unit (410) and the FPCB (420) respectively, and may be formed in a small round hole shape by being arranged at outsides of the through holes (411, 421).

When adhesive is injected to the concave grooves (413, 423) after the stator (400) is mounted on the base (500), the adhesive injected to the concave grooves (413, 423) is introduced into between the periphery of the reception lug unit (550) and the inner surface of the through holes (411, 421) of the stator (400) to restrict any further generation of foreign objects, and to allow firmly mounting the stator (400). Furthermore, the adhesive is introduced downwards to be thereafter introduced into the contact groove (560) formed at the base (500), whereby the stator can be more sturdily mounted.

Furthermore, the base (500) may be formed at an upper surface with a dust trap at a periphery of the through hole (510), which may be formed by epoxy and the like. The dust trap may be formed in a round ring shape with a diameter greater than that of the through hole. However, the dust trap may be formed in various shapes including a square shape. At this time, the dust trap and the reception lug unit (550) may be formed at the same time, and one of the dust trap and the reception lug unit (550) may be formed.

The lens driving device according to the first exemplary embodiment of the present disclosure may further include an elastic member (600) configured to supply a restoring force to the first mover (200) and the second mover (300). The elastic member (600) may be formed by a leaf spring formed by bending and cutting a single plate in order to miniaturize a camera module and to promote the manufacturing efficiency of the camera module.

The elastic member (600) may include a bottom elastic member (620) coupled to a bottom surface of the bobbin (210) and the housing (320), an upper elastic member (610) coupled to an upper surface of the bobbin (210) and the housing (320), and a lateral elastic member (630) configured to elastically support the housing (320) to the base (500).

At this time, two lateral elastic members (630), the upper elastic member (610) and the first coil unit (220) may be electrically connected to allow the two lateral elastic members (630) to transmit a power to the upper elastic member (610) by receiving the power from the PCB (not shown, to be described later), and to allow the upper elastic member (610) to in turn transmit the received power to the first coil unit (220). At this time, the upper elastic member (610) may be formed in two members, where each member may function as a terminal.

In short, each of the upper and bottom elastic members (610, 620) may include a first coupling unit and a second coupling unit, and a connection part configured to connect the first and second coupling units, and the connection part may be formed with at least two bending parts in order to connect the first and second coupling units.

At this time, the first coupling unit of the upper and bottom elastic members (610, 620) may be a portion that is coupled to the housing, and the second coupling unit may be a portion that is coupled to the bobbin, and vice versa. Meantime, the lateral elastic member (630) is to elastically support the housing (310) relative to the base (500), and the first coupling unit and the second coupling unit may be respectively coupled to the housing (320) and the base (500), or to the upper elastic member (610) coupled to the housing (320) and the base (500) respectively.

Furthermore, the lens driving device according to the first exemplary embodiment of the present disclosure may further include a PCB where the PCB may be mounted at a bottom surface of the base (500). The PCB may be mounted at an upper central surface with an image sensor (not shown), and may be mounted with various devices (not shown) for driving the camera module. Furthermore, the PCB may be electrically connected to the aforementioned lateral elastic member (630).

The image sensor (not shown) may be mounted on an upper center of the PDB in order to be positioned along at least one lens accommodated into the lens unit and an optical axis. The image sensor may convert a signal of a light incident through the lens to an electrical signal.

Meantime, the adhesive in the exemplary embodiment may be realized by thermosetting epoxy or UV epoxy, and may be cured by heat or UV exposure. However, the thermosetting epoxy may be a curing method of moving an adhesive in an oven or of directly applying a heat to an adhesive, and the UV epoxy may be a curing method of applying the UV to the adhesive.

Furthermore, the adhesive may be an epoxy in which the thermosetting epoxy and the UV curing epoxy are mixed, and an epoxy where thermosetting and UV curing are all available and therefore, an epoxy where one of the thermosetting and UV curing is selected and cured. The adhesive is not limited to the epoxy and may be replaceable by any that is adherable.

Meantime, the lens driving device according to the first exemplary embodiment of the present disclosure may further include a foreign object exhaust passage (330) interposed between the elastic member (610) and the housing (320) to cause exhaust fluid (drainage) to be naturally exhausted or discharged. Hereinafter, the foreign object exhaust passage (330) will be described in detail with reference to accompanying drawings.

Figure 3:
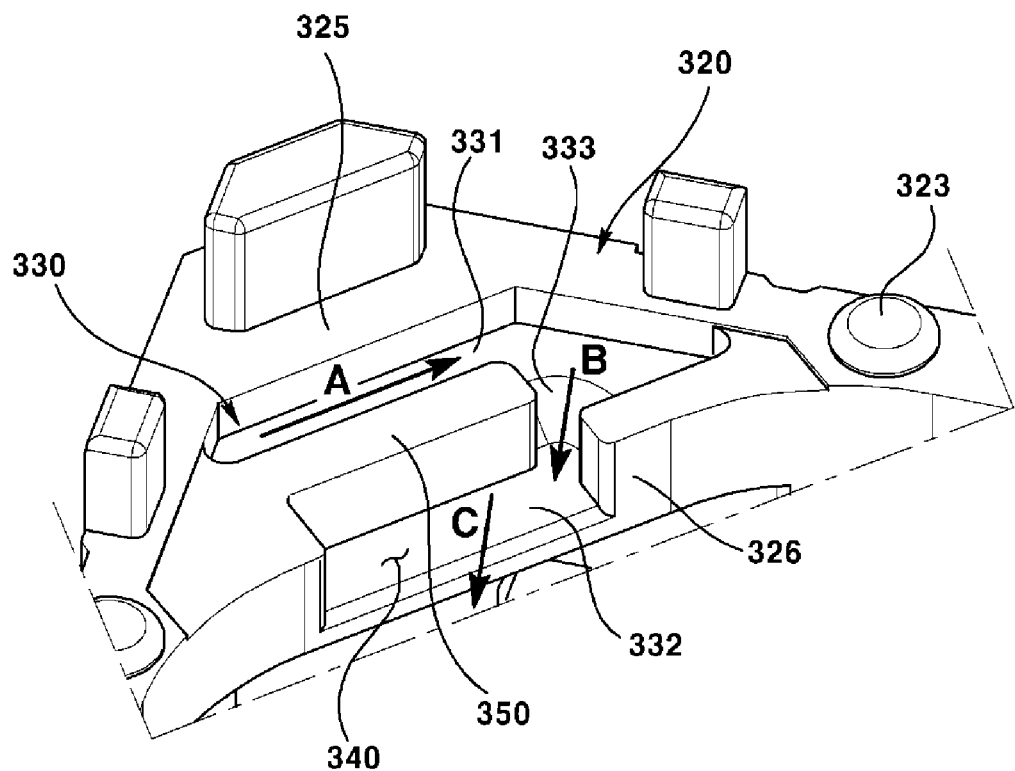
FIG. 3 is an enlarged perspective view of a housing at a lens driving part according to a first exemplary embodiment of the present disclosure.
Figure 4:
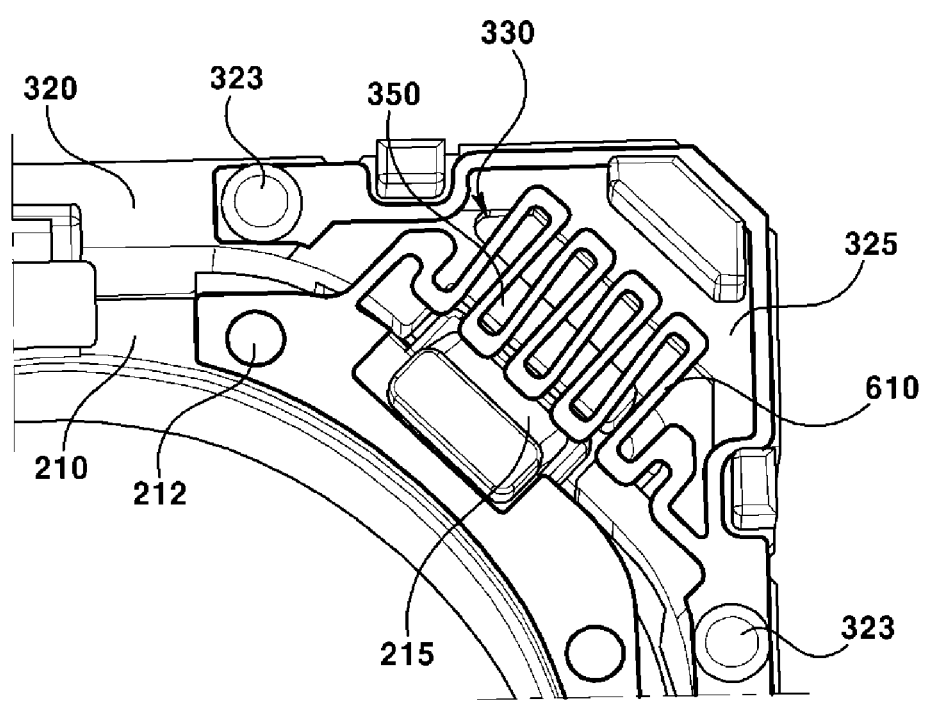
FIG. 4 is a perspective view illustrating a coupled relationship among a housing, a bobbin and an upper elastic member in a lens driving part according to a first exemplary embodiment of the present disclosure.

FIG. 3 is a partially enlarged perspective view of a housing (320) at a lens driving part according to a first exemplary embodiment of the present disclosure, and FIG. 4 is a perspective view illustrating a coupled relationship among a housing, a bobbin and an upper elastic member in a lens driving part according to a first exemplary embodiment of the present disclosure.

Now, referring to FIGS. 3 and 4, the housing (320) according to a first exemplary embodiment of the present disclosure may include a foreign object exhaust passage (330), an opening (340) and a lug (350). Meantime, explanation may be given as the housing (320) including a foreign object exhaust passage (330), an opening (340) and a lug (350). The housing (320) may include an elastic member lug (323). The elastic member lug (323) may be coupled by the elastic members (610, 620). The elastic member lug (323) may be protrusively formed upwards from an upper surface (325) of the housing (320), for example.

The elastic member lug (323) may be so formed as to have a round cross-section, but the present disclosure is not limited thereto and may be formed in any fashion as long as the elastic members (610, 620) can be coupled. Hereinafter, although explanation will be focused on a structure where the elastic member lug (323) of the housing (320) is coupled by the upper elastic member (610), a structure where the elastic member lug (323) is coupled by the bottom elastic member (620) may be inferably applied.

The foreign object exhaust passage (330) may be positioned at one side of the upper elastic member (610) coupled to the elastic member lug (323). The foreign object exhaust passage (330) may be positioned at a bottom surface of the upper elastic member (610) coupled to the housing (320), for example, as illustrated in FIG. 4. The foreign object exhaust passage (330) may be concavely formed at an upper surface (325) of the housing (320). In other words, the foreign object exhaust passage (330) may be formed lower than the upper surface (325) of the housing (320). The foreign object exhaust passage (330) may communicate with the opening (340, described later).

At this time, at least one part of the foreign object exhaust passage (330) may be inclined to a direction of the opening (340). The exhaust fluid positioned the foreign object exhaust passage (330) can be exhausted through the opening (340) through this structure according to an exemplary embodiment of the present disclosure.

Meantime, the foreign object exhaust passage (330) may be injected with a compressed air through an air compressor (not shown), and the air injected to the foreign object exhaust passage (330) may be discharged to the opening (340) along with the foreign objects positioned on the foreign object exhaust passage (330). Furthermore, foreign object exhaust passage (330) may include a first passage (331), a second passage (332) and a connection passage (333). At this time, the second passage (332) is a configuration to selectively support the support lug (215) of the bobbin (210), such that the second passage (332) may be called a "support groove".

The first passage (331) may be concavely formed at an upper surface of the housing (320). The first passage (331) may be also formed directly underneath the upper elastic member (610) coupled to the housing (320). The first passage (331) may communicate with the opening (340) through the second passage (332). That is, the exhaust fluid on the first passage (331) may be discharged to the opening (340) through the second passage (332).

Like the first passage (331), the second passage (332) may be concavely formed at an upper surface of the housing (320). The second passage (332) may be also formed directly underneath the upper elastic member (610) coupled to the housing (320), whereby movement downwards of the bobbin (210) relative to the housing (320) may be restricted to a certain scope. Meantime, the second passage (332) may communicate with the opening (340) through the first passage (331), whereby the exhaust fluid on the first passage (331) may be discharged to the opening (340) through the second passage (332), and the exhaust fluid on the second passage (332) may be directly discharged to the opening (340).

At this time, the second passage (332) may be more concave than the first passage (331). Furthermore, at least one part of the first passage (331) and at least one part of the second passage (332) may be slanted to a direction of the opening (340), whereby the exhaust fluid on the first passage (331) may be naturally discharged to the opening (340) through the second passage (332), and the exhaust fluid on the second passage (332) may be directly and naturally discharged to the opening (340).

The connection passage (333) may connect the first and second passages (331, 332). The connection passage (333) may be positioned at a distal end at one side of the first passage (331), whereby no eddy current can be generated from exhaust fluid moving to the second passage (332) from the first passage (331) to allow the exhaust fluid to be easily discharged to the second passage (332) from the first passage (331).

Meanwhile, at least a part of the first passage (331) may be slanted to a direction of the connection passage (333), and at least a part of the second passage (332) may be slanted to a direction of the opening (340), whereby the exhaust fluid on the first passage (331) may be naturally discharged to the opening (340) through the second passage (332), and the exhaust fluid on the second passage (332) may be directly and naturally discharged to the opening (340).

Furthermore, the connection passage (333) may include a slanted surface (not shown) slanted from the first passage (331) to the second passage (332). Here, the slanted slope simply means that it has a surface with an inclination, and the inclination of the slanted surface needs not be constant or needs not have an angle above or below a predetermined level. In other words, the slanted surface functioning as the connection passage (333) to connect the first and second passages (331, 332) may have a non-constant angle, and an angle of the slanted surface may be very small or may be extremely steep. That is, the slanted surface may be any surface having any type of slant as long as the exhaust fluid of the first passage (331) is naturally discharged to the second passage (332) and the exhaust fluid of the second passage (332) is not reversely flowed.

Meanwhile, the connection passage (333) may include a surface (not shown) tapered off to a direction of the second passage (332) from the first passage (331), for example, and the tapered-off surface is similar to the aforementioned slanted surface in terms of function. That is, the tapered-off surface so functions that the exhaust fluid of the first passage (331) is naturally discharged to the second passage (332) and the exhaust fluid of the second passage (332) is not reversely flowed. However, unlike the slanted surface, the tapered-off surface is different from the slanted surface in that the tapered-off surface is formed with a predetermined angle from the first passage (331) to the second passage (332).

The opening (340) may communicate with the foreign object exhaust passage (330), whereby the exhaust fluid on the foreign object exhaust passage (330) can be discharged to the opening (340). Furthermore, the opening (340) may be formed at one lateral surface of the housing (320). The opening (340) may be formed at an inner surface (326) of the housing (320), as an example illustrated in FIG. 3. Even in this case, the opening (340) can communicate with the foreign object exhaust passage (330) to function as an outlet of the exhaust fluid.

The opening (340) may take a shape opened at an upper surface, as illustrated in FIG. 3, but the present disclosure is not limited thereto and may take any shape as long as the opening (340) functions as an exhaust outlet to exhaust the exhaust fluid. Meantime, the opening (340) may provide a space to allow the support lug (215) of the bobbin (210) to vertically move.

The lug (350) may be interposed between the first and second passages (331, 332) and more protruded than the first passage (331) to support the upper elastic member (610) coupled to the housing (320). Thus, the lug (350) may be positioned directly underneath the upper elastic member (610) coupled to the housing (320). At this time, there is no need that the lug (350) and the upper elastic member (610) are always being contacted, and the contact between the lug (350) and the upper elastic member (610) may be generated when the upper elastic member (610) moves.

Meantime the lug (350) may take a shape of the second passage (332) selectively supported by the support lug (215) of the bobbin (210). The shape of the second passage (332) formed by the lug (350) may correspond to that of the support lug (215) of bobbin (210).

Hereinafter, a coupled structure of the housing (320), the foreign object exhaust passage (330), the upper elastic member (610) and the bobbin (210) will be described with reference to FIG. 4.

The upper elastic member (610) may be coupled to the elastic member lug (320) of the housing (320) and the elastic member lug (212) of bobbin (210). That is, the housing (320) and the bobbin (210) may be coupled by the upper elastic member (610) having an elasticity, whereby the bobbin (210) can relatively move to the housing (320). However, the relative movement of the bobbin (210) to the housing (320) may be restricted to a certain scope because the lug (215) of bobbin (210) is selectively supported by the second passage of the housing (320). Meantime, the upper elastic member (610) may be positioned thereunder with the foreign object exhaust passage (330) formed by being concaved by the upper surface (325) of the housing (320). Furthermore, the lug more protrusively formed than the foreign object exhaust passage (330) may support the upper elastic member (610). At this time, as discussed above, the lug (350) may selectively support the upper elastic member (610) in response to the movement of the upper elastic member (610).

Hereinafter, operation of the lens driving part according to a first exemplary embodiment of the present disclosure will be described in detail with reference to FIG. 4.

FIG. 4 is a perspective view illustrating a coupled relationship among a housing, a bobbin and an upper elastic member in a lens driving part according to a first exemplary embodiment of the present disclosure.

Referring to FIG. 4, it is premised of a status that the upper elastic member (610) is coupled to the housing (320) and the bobbin (210). However, it should be also noted that the following description may be inferably applied to a situation where the upper elastic member (610) is coupled to the housing (320) while the bobbin (210) is not coupled.

Foreign objects such as threads, dust and metal shreds are interposed between the upper elastic member (610) and the housing (320). At this time, a worker has to essentially perform a foreign object removal operation, because if assembly work of camera module is completed with foreign objects included therein, the foreign objects may affect the upper elastic member (610) to cause an auto focusing tilt defect.

Thereafter, the worker may inject detergent to the upper elastic member (610) and the housing (320). The injected detergent is mixed with the foreign objects, where we have already discussed the commonly-defined exhaust fluid in which the foreign objects and detergents are mixed.

Meantime, the exhaust fluid flows downward due to influence by gravitational force as time passes, whereby the exhaust fluid on the upper elastic member (610) is introduced into the foreign object exhaust passage (330) positioned thereunder.

Thereafter, the exhaust fluid on the foreign object exhaust passage (330) moves to the second exhaust passage (332) along the connection passage (333) slantly formed on the first passage (331)(see FIGS. 1A and 1B). Meantime, the exhaust fluid introduced into the second passage (332) is discharged through via the opening (340) (see FIG. 3C).

The exemplary embodiment of the present disclosure has an advantage of removing the foreign objects positioned between the upper elastic member (610) and the housing (320) using only the abovementioned operation.

Hereinafter, of a lens driving part according to a second exemplary embodiment of the present disclosure will be described in detail with reference to the accompanying drawings.

Figure 5:
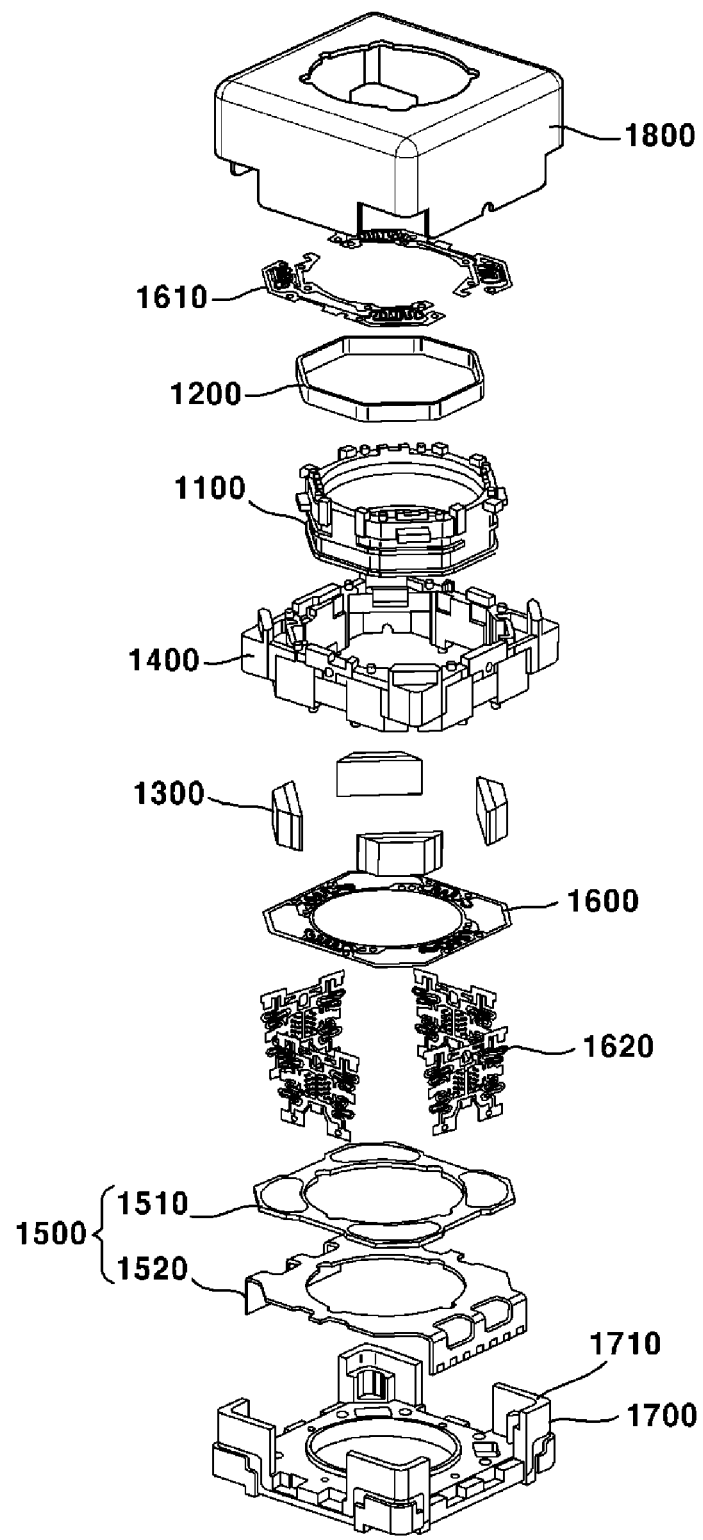
FIG. 5 is an exploded perspective view of a lens driving part according to a second exemplary embodiment of the present disclosure.
Figure 6:
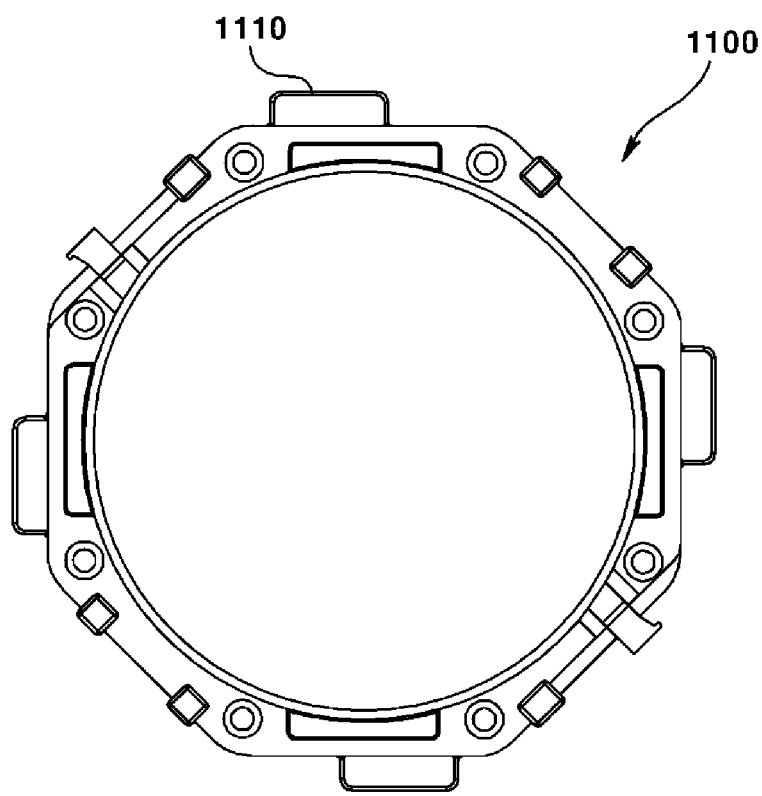
FIG. 6 is a plan view illustrating a bobbin according to a second exemplary embodiment of the present disclosure.
Figure 7:
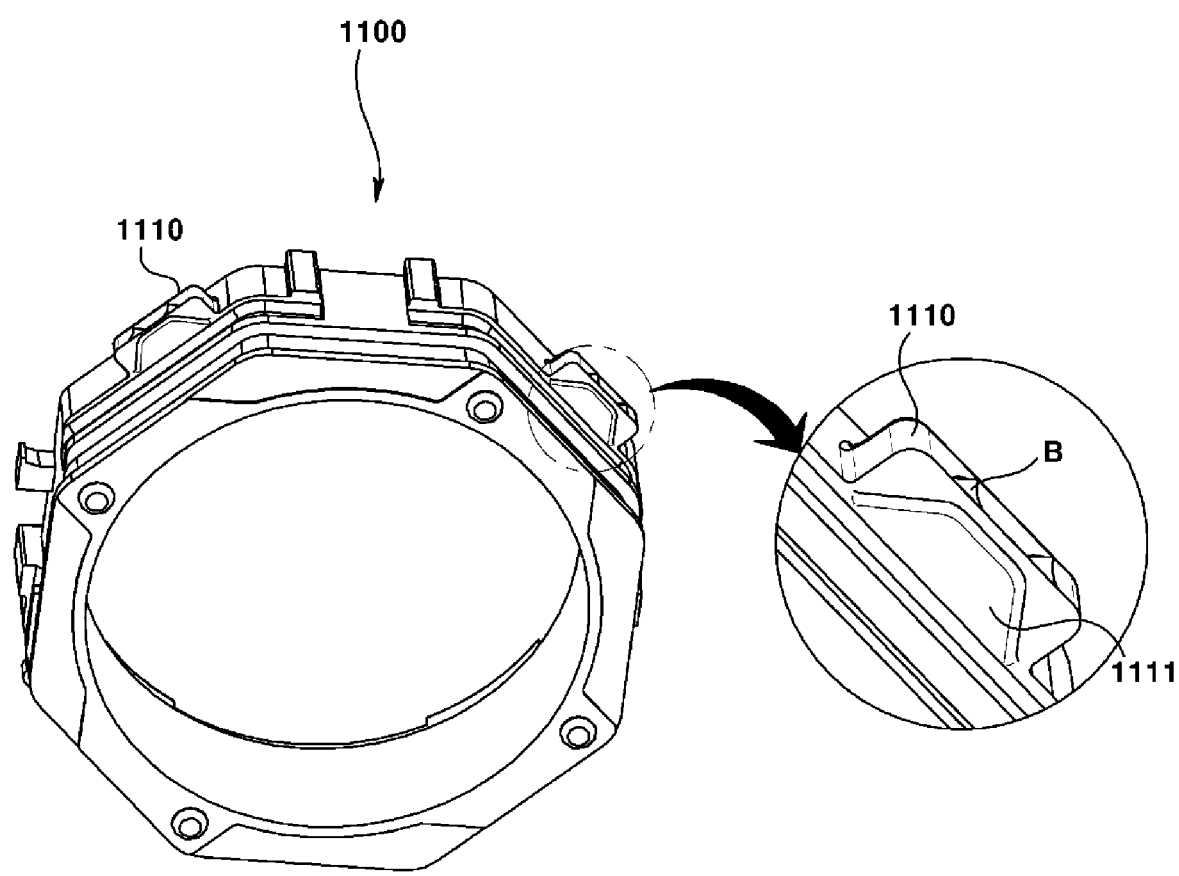
FIG. 7 is a bottom perspective view illustrating a bobbin according to a second exemplary embodiment of the present disclosure.
Figure 8:
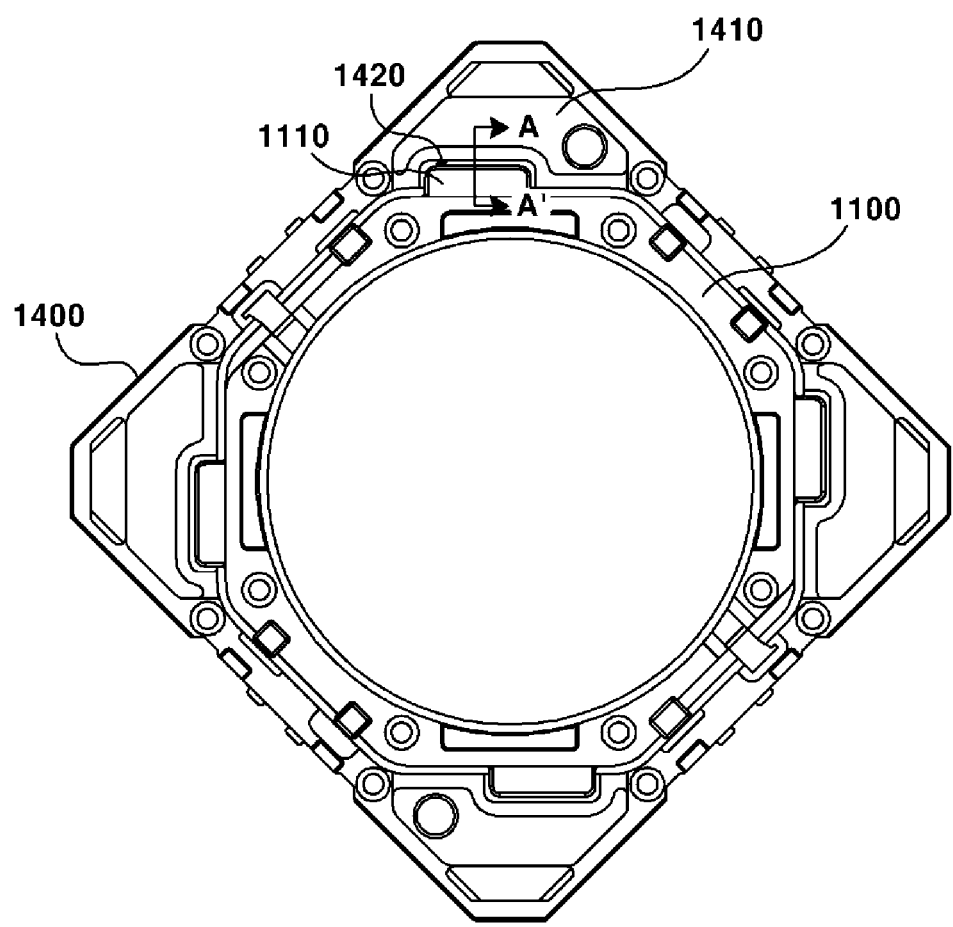
FIG. 8 is a plan view illustrating a coupled shape between a bobbin and a housing according to a second exemplary embodiment of the present disclosure.
Figure 9:
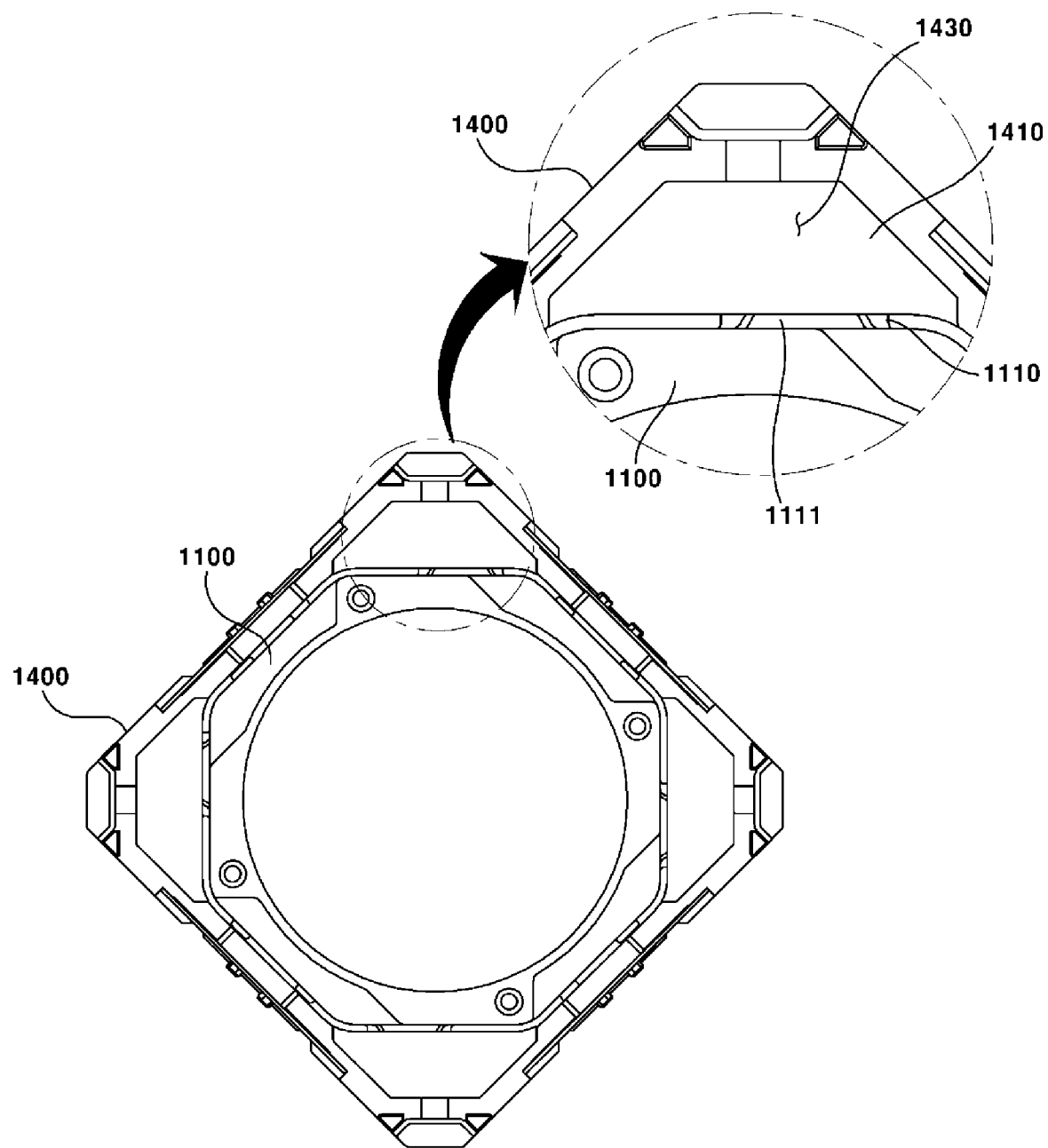
FIG. 9 is bottom view illustrating a coupled shape between a bobbin and a housing according to a second exemplary embodiment of the present disclosure.
Figure 10:
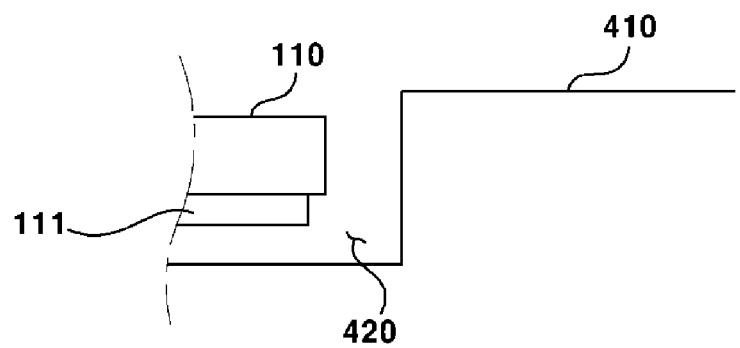
FIG. 10 is a cross-sectional view taken along A-A' of FIG. 8.

FIG. 5 is an exploded perspective view of a lens driving part according to a second exemplary embodiment of the present disclosure, FIG. 6 is a plan view illustrating a bobbin according to a second exemplary embodiment of the present disclosure, FIG. 7 is a bottom perspective view illustrating a bobbin according to a second exemplary embodiment of the present disclosure, FIG. 8 is a plan view illustrating a coupled shape between a bobbin and a housing according to a second exemplary embodiment of the present disclosure, FIG. 9 is bottom view illustrating a coupled shape between a bobbin and a housing according to a second exemplary embodiment of the present disclosure, and FIG. 10 is a cross-sectional view taken along A-A' of FIG. 8.

Referring to FIGS. 5 to 10, a lens driving part according to a second exemplary embodiment of the present disclosure may include a bobbin (1100), an AF (Auto Focusing) coil (1200), a magnet (1300) and a housing (1400), and may further include a stator (1500), first and second elastic members (1600, 1610), an OIS (Optical Image Stabilization) spring (1620), a base (1700) and a cover can (1800).

The bobbin (1100) may take an upper/bottom opened pillar shape and may be formed with a pillar-shaped hollow hole. The hollow hole of the bobbin (1100) may be formed with one or more than two lenses to accommodate a lens unit (not shown) through which a light can pass, where the lens unit is then screw-coupled. Furthermore, the bobbin (1100) may be protrusively formed with a stopper (1110) toward an outside. The AF coil (1200) may be wound on an outside of the bobbin (1100).

The magnet (1300) may face the AF coil (1200) wound on the outside of the bobbin (1100), where the magnet may be formed in a plural number. When the magnet is formed in a plural number, a distance between adjacent magnets (1300) may be arranged at an equal space. When a current flows in the AF coil (1200), a magnetic field is formed at the AF coil (1300) where the magnet (1300) can vertically move the bobbin (1100) according to an electrical interaction with the AF coil (1200).

The housing (1400) may be formed with a hollow hole and opened at upper and bottom sides. The housing (1400) may accommodate the bobbin (1100) where the bobbin (1100) may move vertically inside the housing (1400). The housing (1400) may be formed at an inner side of the corner with a plate-shaped rib (1410) diagonally extended from one surface to the other adjacent surface. A space at an inner corner may be divided to an upper section and a bottom section by the rib (1410). The rib (1410) may be downwardly formed with a magnet accommodation unit (1430) to accommodate the magnet (1300) to allow a bottom surface of the rib (1410) to touch an upper surface of the magnet (1300).

The rib (1410) may be formed at an upper surface with a stopper accommodation groove (1420) to accommodate the stopper (1110) of bobbin (1100), and inner walls of the stopper accommodation groove (1420) facing a distal end of the stopper (1110) formed to a direction distancing from an optical axis may be so formed as not to touch each other, and a bottom surface of the stopper (1110) and a floor surface of the stopper accommodation groove (1420) may be so arranged as to face each other.

The elastic member may be divided to a first elastic member (1600) and a second elastic member (1610). The first elastic member (1600) may be formed with a leaf spring and arranged at a bottom surface of the housing (1400). The first elastic member (1600) may be formed with a hole to pass a light through a lens unit. An upper surface at a periphery of a hole of the first elastic member (1600) may abut a bottom surface of the bobbin (1100) to elastically support the bobbin (1100) from the housing (1400).

The second elastic member (1610) may be arranged at an upper surface of the housing (1400). The second elastic member (1610) may be formed with a hole to pass a light through a lens unit. A bottom surface about a hole of the second elastic member (1610) may abut an upper surface of the bobbin (1100) to allow elastically support the bobbin (1100) from the housing (1400).

The first and second elastic members (1600, 1610) may elastically support the bobbin (1100) vertically ascended and descended by the magnet (1300) to restore the bobbin (1100) moved along an optical axis direction.

Meantime, although the second exemplary embodiment of the present disclosure has described the arrangement of the first and second elastic members (1600, 1610), the present disclosure is not limited thereto and the first and second elastic members (1600, 1610) may be variably arranged according to a user selection.

The base (1700) may be formed at each corner with a pillar (1710), and the housing (1400) may be arranged toward an inner side of the pillar (1710), where the base (1700) may movably prop and support the housing (1400) through the OIS spring (1620). The housing (1400) supported by the base (1700) can horizontally move as much as a spaced-apart distance because the housing (1400) is spaced apart from the pillar (1710). The base (1700) may be formed with a hole to pass a light through a lens unit. The stator (1500) and the first elastic member (1600) are interposed between the base (1700) and the housing (1400), where the stator (1500) may be an OIS coil (1510) and an FPCB (Flexible Printed Circuit Board, 1520).

The OIS coil (1510) may be arranged at a bottom surface of the first elastic member (1600). The OIS coil (1510) may be formed with a plate material and formed with a hole to pass a light through a lens unit. The first elastic member (1600) may be arranged between the OIS coil (1510) and the housing (1400). The OIS coil (1510) may face a bottom surface of the magnet (1300) accommodated into the housing (1400) across a through hole formed at the first elastic member (1600). The OIS coil (1510) performs a function of correcting a user handshake by horizontally moving the bobbin (1100) mounted with a lens unit and the housing (1400) relative to an image sensor (described later). That is, when a current flows in the OIS coil (1510), a magnetic field is formed on the OIS coil (1510) to horizontally move the housing (1400) and the bobbin (1100) accommodated into the housing (1400) in response to an electromagnetic interaction with the magnet (1300).

The FPCB (1520) may apply a power to the OIS coil (1510). The FPCB (1520) may be arranged at a bottom surface of the OIS coil (1510). The FPCB (1520) may be formed with a hole to pass a light through a lens unit. The FPCB (1520) may transmit a current supplied through a terminal formed at one side to the OIS coil (1510) or to an OIS spring (1620, described later), where the current transmitted to the OIS spring (1620) may be supplied to the AF coil (1200) through the second elastic member (1610) to allow forming a magnetic field on the AF coil (1200), or the OIS coil (1510).

The OIS (Optical Image Stabilization) spring (1620) may be arranged at a later surface of housing (1400). The OIS spring (1620) may elastically support the housing (1400) relative to the base (1700). The OIS spring (1620) may perform a function of restoring the bobbin (1100) and the housing (1400) horizontally moved relative to an image sensor (described later) in response to a magnetic field formed by the OIS coil (1510) and the magnet (1300).

Albeit not being illustrated in the drawing, a PCB may be arranged at a bottom surface of the base (1700). The PCB may be mounted at an upper center area with an image sensor configured to convert a light having passed the lens unit to an electric signal. The PCB may be arranged with various elements to operate the image sensor or with a plurality of terminal units configured to supply a power or to output information of the image sensor. In addition, the base (1700) may be mounted with an IR (Infrared) cut-off filter configured to filter an IR before a light having passed a lens unit reaches the image sensor.

The cover can (1800) may be arranged outside of the housing (1400) to cover or wrap the aforementioned various elements. The cover can (1800) may be formed with a hole to allow a light to pass through a lens unit.

The bobbin (110) may be manufactured by injection molding.

With reference to FIGS. 6 to 9, the bobbin (1100) may be formed at a periphery with a stopper (1110) to a direction distancing from an optical axis in order to limit movement of the bobbin (1100) up to a predetermined height of the housing (1400) while vertically moving inside the housing (1400). The bobbin (1100) may be formed with burrs (B) on the stopper (1110) due to characteristics of injection molding.

With reference to FIG. 10, the second exemplary embodiment of the present disclosure illustrates that a contact part (not shown) may be provided at a bottom surface of the stopper (1110), and a lug (1111) may be formed by a part of the bottom surface of the contact part being protruded downward to form a staircase sill, or a staircase sill lug (1111) may be formed by a part of the bottom surface of the contact part being concaved.

In the second exemplary embodiment of the present disclosure, the lug (1111) is formed at a bottom surface of the stopper (1110), as illustrated in FIG. 10, to allow a bottom surface of the lug (1111) to abut an upper surface of the rib (1410), whereby a contact area between the stopper (1110) and the rib (1410) can be reduced. At this time, the upper surface of the rib (1410) may be accommodated with the stopper (1110) to form the stopper accommodation groove (1420).

Albeit not being illustrated in the drawing, any one of the bottom surface of lug (1111) at the stopper (1110), the upper surface of the rib (1410) and the floor surface of the stopper accommodation groove (1420) may be attached with a cushion material of elastic material such as rubber or a silicone.

When the stopper contacts the rib (1410) or the stopper accommodation groove (1420), the lug (1111) may be directly brought into contact with the rib (1410) or the stopper accommodation groove (1420), and therefore, a contact area with a floor surface of the stopper (1110) and the rib (1410) or the stopper (1110) and the stopper accommodation groove (1420) can be reduced by the lug (1111), whereby a partial space is formed between the stopper (1110) and the rib (1410) or the stopper (1110) and the stopper accommodation groove (1420), and a burr (B) formed at the stopper (1110) is not made to contact the rib (1410) or the stopper accommodation groove (1420), and the burr (B) is not dropped out from the stopper (1110).

The burr (B) may be formed at a distal end of the stopper (1110) facing an outside from an optical axis, for example. In this case, the distal end of the stopper (1110) facing the outside from the optical axis may be spaced apart as much as a predetermined distance from an inner wall of the stopper accommodation groove (1420) opposite to the distal end or an inner side of the corner of the housing (1400), such that the burr (B) may not contact the stopper accommodation groove (1420) or the inner side of the corner of the housing (1400), and the burr (B) may not be detached from the stopper (1110).

The burr (B) may be formed at a bottom surface or a bent area just below the distal end of the stopper (1110) facing the outside from the optical axis, as another example of the formation position of the burr (B). In this case, the stopper (1110) may be brought into contact with an upper surface of the rib (1410) at the housing (1400) or a floor surface of the stopper accommodation groove (1420) formed at the stopper (1110), when the bobbin (1100) vertically moves inside the housing (1400).

Furthermore, the burr (B) formed at the stopper (1110) may generate a frequent contact with the stopper accommodation groove (1420) formed at the stopper (1110), or the upper surface of the rib (1410). As a result, the burr (B) is detached from the stopper (1110) to allow the detached burr (B) to stay existent inside the camera, whereby functions of other elements are obstructed to cause an operational defect to the camera. However, in the second exemplary embodiment of the present disclosure, the burr (B) is not detached from the stopper (1110) to be free from contact with the upper surface of rib (1410) or the floor surface of the stopper accommodation groove (1420), because the lug (1111) formed at the stopper (1110) is formed thicker than the burr (B).

The lug (1111) of the lens driving device according to the second exemplary embodiment of the present disclosure may have a shape tapering off to a direction distancing from the optical axis, and particularly, as shown in the drawing, may have a pillar shape with a bottom surface and an upper surface with a trapezoidal shape. The lug (1111) of the lens driving device according to the second exemplary embodiment of the present disclosure may have variable selections according to a user's intention. For example, the lug (1111) may have a cylindrical shape, a polygonal shape, a polyhedral shape including a cone shape or a conical shape, or may be formed in a plural fashion.

Hereinafter, a configuration of a lens driving device according to a modified example of a second exemplary embodiment of the present disclosure will be described with reference to the accompanying drawing.

Figure 11:
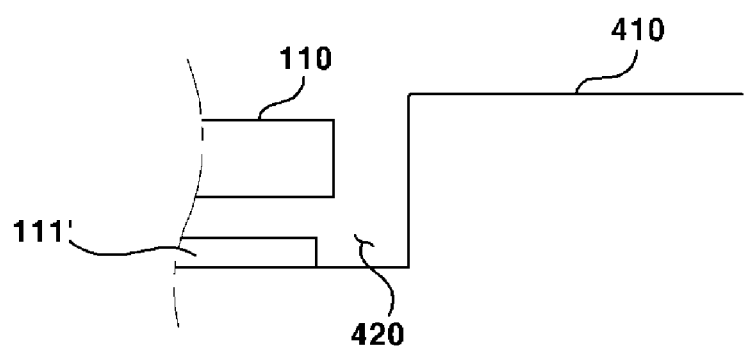
FIG. 11 is a cross-sectional view of a bobbin and a housing according to a modified example of a second exemplary embodiment of the present disclosure.

FIG. 11 is a cross-sectional view of a bobbin and a housing according to a modified example of a second exemplary embodiment of the present disclosure.

Referring to FIG. 11, the modified example of a second exemplary embodiment of the present disclosure may be configured in a manner such that an upper surface of a rib (1410) is formed with a contact area (not shown), a part of the contact area is upwardly protruded to provide a lug (1111) formed with a staircase, and an upper surface of a lug (1111') abuts a bottom surface of a stopper (1110) and the lug (1111) is protruded from a bottom surface of a stopper (1110), the configuration of which is different from that of the second exemplary embodiment.

As in FIG. 11, the modified example of a second exemplary embodiment of the present disclosure may be preferably configured in a manner such that an upper surface of a rib (1410) is formed with a stopper accommodation groove (1420) to allow accommodating a stopper (1410), a floor surface of the stopper accommodation groove (1420) is formed with a lug (1111') to allow an upper surface of the lug (1111') to contact a bottom surface of the stopper (1110), and the lug (1111') is thicker than a conventional thickness of the burr (B) formed on the stopper (1110).

Albeit not being illustrated in the drawing, any one of a bottom surface of the stopper (1110) and an upper surface of lug (1111') at the rib (1410) may be attached with a cushion material of elastic material such as a rubber or a silicone.

Meantime, when a lug (1111,1111') may be formed on an upper surface of stopper (1110) or rib (1410), or the stopper accommodation groove (1420) to reduce a contact area between the stopper (1110) and the rib (1410) or between the stopper (1110) and the stopper accommodation groove (1420), fraction remaining in the housing (1400) or stickiness between the stopper (1110) and the rib (1410) due to foreign objects can be reduced, and as stickiness is reduced, an additional effect can be expected of the defect rates of camera such as auto focusing tilt phenomenon or hysteresis of camera being decreased.

It should be appreciated that, while all the elements comprising the foregoing exemplary embodiments have been presented to be coupled to one or operated by being coupled, the present disclosure is not limited thereto. All the elements may operate by being selectively coupled to one or more than one.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The above-mentioned camera module according to the exemplary embodiments of the present disclosure may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents.

While particular features or aspects may have been disclosed with respect to several embodiments, such features or aspects may be selectively combined with one or more other features and/or aspects of other embodiments as may be desired.

The invention claimed is:

1. A lens driving device, comprising:
a base;
a housing disposed on the base;
a bobbin disposed in the housing;
a first coil disposed on the bobbin; and
a magnet overlapped with the first coil in a first direction perpendicular to an optical axis direction,
wherein the bobbin comprises a stopper protruding from an outer lateral surface of the bobbin, and
wherein the stopper of the bobbin comprises a convex part and a concave part in a lower portion of the stopper.

2. The lens driving device of claim 1, comprising a second mover comprising the housing and the magnet,
wherein the concave part of the stopper of the bobbin is overlapped with the second mover in the optical axis direction.

3. The lens driving device of claim 2, wherein the concave part of the stopper of the bobbin is not contacted with the second mover when the convex part of the stopper of the bobbin contacts with the second mover.

4. The lens driving device of claim 1, wherein the concave part of the stopper of the bobbin is opened outside.

5. The lens driving device of claim 1, comprising a second mover comprising the housing and the magnet,
wherein the convex part of the stopper contacts with the second mover when the bobbin moves towards the base.

6. The lens driving device of claim 1, wherein the bobbin comprises a coil accommodation groove formed on the outer lateral surface of the bobbin, and
   wherein the first coil is disposed on the coil accommodation groove of the bobbin.

7. The lens driving device of claim 1, wherein the convex part protrudes from a lower surface of the stopper.

8. The lens driving device of claim 1, wherein a lower surface of the concave part of the stopper is connected to an outer lateral surface of the stopper.

9. The lens driving device of claim 1, wherein an area of a lower surface of the convex part is greater than an area of a lower surface of the concave part.

10. The lens driving device of claim 5, wherein the concave part of the stopper of the bobbin is configured to reduce a contact area between the stopper and the second mover.

11. The lens driving device of claim 1, wherein the stopper of the bobbin is disposed at a position higher than the first coil.

12. The lens driving device of claim 1, wherein the stopper of the bobbin comprises four stoppers, and
   wherein the four stoppers are symmetrical to each other with respect to an optical axis.

13. The lens driving device of claim 1, wherein the stopper of the bobbin comprises a first stopper disposed on a first lateral surface of the bobbin,
   wherein the housing comprises a first inner lateral surface facing the first lateral surface of the bobbin and disposed between a first corner portion of the housing and a second corner portion of the housing, and
   wherein the first stopper is nearer to the first corner portion of the housing than to the second corner portion of the housing.

14. The lens driving device of claim 1, comprising a second coil overlapped with the magnet in the optical axis direction.

15. The lens driving device of claim 1, wherein the housing comprises a plate-shaped rib,
   wherein a lower surface of the rib contacts with an upper surface of the magnet, and
   wherein the rib comprises a stopper accommodation groove formed on an upper surface of the rib to accommodate at least a portion of the stopper of the bobbin.

16. The lens driving device of claim 1, comprising:
   an upper elastic member coupled with an upper surface of the bobbin; and
   an OIS spring configured to elastically support the housing relative to the base.

17. The lens driving device of claim 16, wherein the upper elastic member and the OIS spring are electrically connected with the first coil.

18. The lens driving device of claim 1, comprising a cover can disposed outside of the housing.

19. A camera module, comprising:
   a printed circuit board;
   an image sensor disposed on the printed circuit board;
   the lens driving device of claim 1; and
   a lens coupled to the bobbin of the lens driving device and spaced apart from the image sensor.

20. A mobile phone comprising the camera module of claim 19.

* * * * *